Patented Apr. 25, 1944

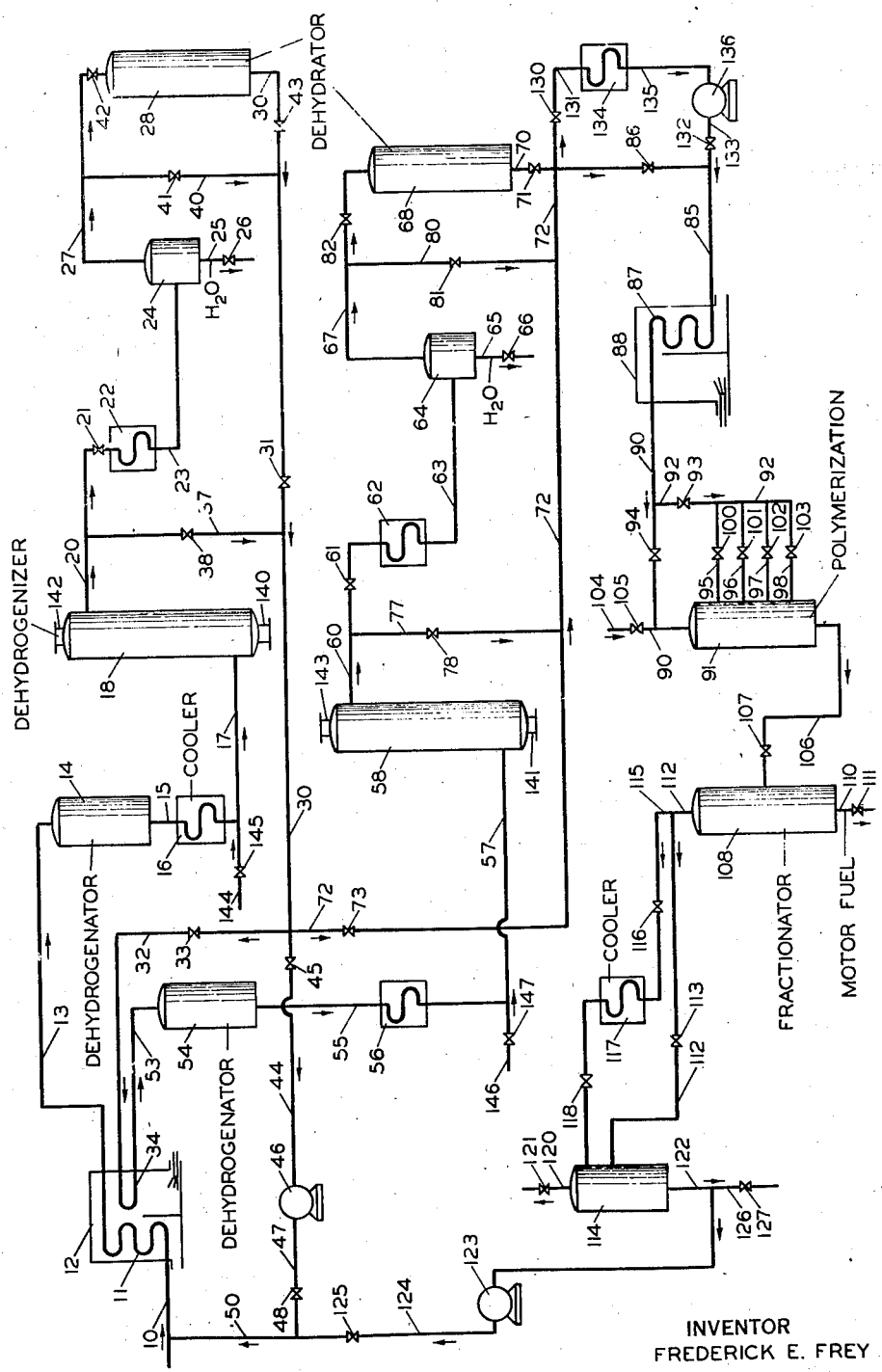

2,347,256

UNITED STATES PATENT OFFICE 2,347,256

PROCESS FOR CONVERTING HYDROCARBONS

Frederick E. Frey, Bartlesville, Okla., assignor to Phillips Petroleum Company, a corporation of Delaware Application November 12, 1940, Serial No. 365,359

13 Claims. (Cl. 260—677)

This invention relates to the conversion of low-boiling paraffin hydrocarbons into higher-boiling hydrocarbons. More specifically it relates to the conversion of paraffins having from three to five carbon atoms per molecule, or mixtures thereof, into hydrocarbons of higher boiling point or range than the material so converted and in the boiling range of gasoline.

It has been proposed to convert normally gaseous paraffin hydrocarbons, heavier than methane, into heavier hydrocarbons by catalytically dehydrogenating them to produce unsaturated hydrocarbons, such as olefins having the same or a fewer number of carbon atoms per molecule, and in a second step to convert the unsaturates by synthesis reactions into hydrocarbons in the boiling range of gasoline. The dehydrogenation of simple paraffins is a part of an equilibrium reaction of which the other part is a union of free hydrogen and unsaturates, so that the dehydrogenation tends to be suppressed by high pressures and by a high concentration of hydrogen; accordingly dehydrogenation is ordinarily conducted at low pressures. The synthesis reactions wherein unsaturated hydrocarbons react to produce heavier hydrocarbons, are generally operated at relatively high pressures, and may comprise polymerization of unsaturates only, or may be of the more specific type known as alkylation, which involves juncture of unsaturates with saturated-type hydrocarbons such as paraffins, naphthenes, or aromatics. These synthesis reactions may be conducted by thermal means alone or with the aid of catalysts, depending somewhat upon the materials reacted and upon the product desired, the various modifications not being full equivalents of each other. Since the presence of hydrogen in these synthesis reactions is undesirable, it is generally removed, and ordinarily such removal entails expensive gas-compression steps, followed by one of a number of separation methods which generally involve cooling of a gas-liquid mixture and the separation of a gas phase from a liquid phase. Consequently considerable expense is entailed in the separation and disposal of hydrogen and in elevating the pressure of a gaseous mixture from a low dehydrogenation pressure to a higher level suitable for such removal of hydrogen and/or for the subsequent synthesis reactions. In order to avoid the expense of elevating the pressure by compression of gases between successive steps, the alternative has been the operation of one step or another at an inefficient pressure level.

The present invention is concerned with a multistep process for producing normally liquid hydrocarbons especially hydrocarbons suitable for motor fuel, from lighter paraffin hydrocarbons or mixtures thereof, which includes in combination two or more steps involving catalytic dehydrogenation at more or less elevated pressures to form unsaturated hydrocarbons having low molecular weights, each of such steps being followed by removal of hydrogen, without substantial change of pressure, so that further dehydrogenation in a subsequent step is not substantially suppressed, and finally a conversion at relatively high pressures of unsaturates so produced to form liquid hydrocarbons without intermediate gas-compression steps. I have found that I can catalytically dehydrogenate low-boiling paraffin hydrocarbons at elevated pressures, such as 50 to 1000 pounds per square inch and preferably 250 to 500 pounds per square inch, in a series of steps by effecting only a limited amount of dehydrogenation in each step, removing free hydrogen so produced in each step by chemical action, and thus obtain a hydrocarbon material with a substantial content of olefin hydrocarbons. I have further found that by following such a procedure the resultant hydrocarbon material exists under pressure sufficient either to be adequate for a subsequent conversion of the olefins, or for liquefaction when cooled by ordinary cooling water, so that the subsequent conversion can be operated at a higher pressure with only the slight expense of pumping a liquid material. I have also found that hydrogen can be removed after such dehydrogenation by reaction with metal oxides, such as copper oxide, without the metal produced by the reduction acting to hydrogenate olefins in the presence of additional hydrogen by incorporating in the copper oxide mixture, and/or in the reactant mixture, a material which will act to poison, or inhibit, the metal insofar as hydrogenating activity is concerned. While pressure tends to suppress dehydrogenation, this effect may be partly avoided by operating appreciably above the lowest of dehydrogenation temperatures ordinarily usable for the particular catalyst employed. Often an operating pressure may be selected such that the dehydrogenation effluent after dehydrogenizing, or removal of free hydrogen, is liquefiable upon admixture with normally liquid hydrocarbons or by simple condensation without resorting to subatmospheric temperatures.

It is an object of my invention to provide a process for the conversion of paraffin hydrocarbons heavier than methane into other hydrocarbons of higher molecular weight with a minimum of operating expense.

It is another object of my invention to provide a multistep process for the conversion of paraffin hydrocarbons heavier than methane and having not more than five carbon atoms per molecule into hydrocarbons in the motor-fuel boiling range.

Another object of this invention is to simplify or eliminate the concentrating operation which follows a dehydrogenation step without sacrificing efficiency in the dehydrogenation and conversion steps.

A further object is to reduce the expense entailed in developing a higher pressure for a synthesis step which follows the dehydrogenation of paraffin hydrocarbons.

A still further object is to provide a process for the removal of the hydrogen in a multistep hydrocarbon conversion process by the reduction of metal oxides without the concomitant rehydrogenation of the olefins formed beforehand in the dehydrogenation.

An object of my invention is to subject a hydrocarbon material comprising gaseous paraffins heavier than methane to a catalytic dehydrogenation in two or more steps under a pressure higher than ordinarily is used for simple dehydrogenation, to remove by chemical means free hydrogen after each dehydrogenation step without effecting substantial hydrogenation of desired unsaturates, and finally to convert unsaturates so produced to heavier hydrocarbons, all without employing undesirable and expensive gas-compression steps.

Other objects and advantages of my invention will be apparent from the accompanying disclosure.

The processes of my invention will now be described in connection with the accompanying drawing, which forms a part of the specification and in which is shown diagrammatically one arrangement of apparatus wherein a preferred modification of my process may be carried out.

A hydrocarbon mixture consisting essentially of paraffin hydrocarbons having from 3 to 5 carbon atoms per molecule, or consisting essentially of only one or two hydrocarbons within this range, such as a propane-butane mixture, or a mixture of butanes, enters the process through conduit 10 under a suitable pressure and passes through coil 11 which is located in a heater 12 wherein the temperature is elevated to a level suitable for subsequent catalytic dehydrogenation. The hot hydrocarbon stream passes from heating coil 11 through conduit 13 to a dehydrogenation chamber 14 which contains a suitable dehydrogenation catalyst and wherein a partial dehydrogenation is effected, producing olefin hydrocarbons and free hydrogen. The effluent of this chamber then passes through conduit 15, cooler 16 and through conduit 17 to dehydrogenizing chamber 18 wherein a dehydrogenizing, or removal of hydrogen, hereinafter described, takes place. This dehydrogenizing removes substantially all of the free hydrogen from the mixture passing through chamber 18 and is accomplished in this instance by contacting the dehydrogenation effluent with a reducible metal oxide, such as copper oxide, whereby the hydrogen reacts with the oxide forming water and leaving a reduced metal. The effluent of this chamber, which now contains essentially paraffin and olefin hydrocarbons and water vapor, passes through conduit 20 and valve 21 to cooler 22 wherein it is cooled to a temperature such that an appreciable portion of the water is condensed. From cooler 22 the stream passes through conduit 23 to a water separator 24. Water which has been condensed collects in separator 24 and may be removed therefrom through conduit 25 controlled by valve 26. The rest of the stream passes through conduit 27 to chamber 28 wherein a further and substantially complete removal of water is effected. Chamber 28 contains a suitable drying agent such as activated alumina or bauxite, or calcium chloride, or the like. The dried stream passes from chamber 28 through conduit 30, valves 43 and 31, conduit 32, controlled by valve 33, and through heating coil 34, which may be also located in the furnace or heating element 12.

In some cases, partial or complete removal of water from the material passing through conduit 20 is not necessary. In case subsequent operations are such that it is not necessary to remove any of the water, valve 21 in conduit 20 may be closed and the effluent of chamber 18 may be passed through conduit 37 controlled by valve 38, passing therefrom directly into conduit 30, valve 31 in conduit 30 being also closed. In case a partial removal of water is desirable but a complete removal unnecessary, the effluent of chamber 18 is passed through conduit 20 and valve 21, as previously described, valve 38 being closed and a substantial part of the water is removed through conduit 25. The stream which has now been partially dried leaves separator 24 through conduit 27 and may be passed directly to conduit 30 through conduit 40 controlled by valve 41, valve 42 in conduit 27 and valve 43 in conduit 30 being closed.

The material passing through heating coil 34 is heated to a suitable dehydrogenation temperature and passes through conduit 53 to dehydrogenation chamber 54 which contains a suitable dehydrogenation catalyst. The subsequent treatment of this stream is similar to that described in connection with the stream passing through conduit 13 to dehydrogenation chamber 14. It will of course be evident that the material to be dehydrogenated which is heated in heating coil 34 has a somewhat different composition from the material being heated in heating coil 11 and for this reason somewhat modified reaction conditions may have to be maintained in particular instances, especially in heating coil 34 and dehydrogenation chamber 54. In general, however, substantially the same conditions may be used as were used previously.

The hot effluent stream passes from heating coil 34 through conduit 53 to a dehydrogenation chamber 54 which contains a suitable dehydrogenation catalyst and wherein a further dehydrogenation is effected, producing olefin hydrocarbons, and free hydrogen. The effluent of this chamber then passes through conduit 55, cooler 56 and through conduit 57 to dehydrogenizing chamber 58 wherein a second dehydrogenizing takes place. This dehydrogenizing removes substantially all of the hydrogen from the mixture passing through chamber 58 and can also be accomplished by contacting this mixture with a reducible metal oxide, such as copper oxide, whereby the hydrogen reacts with the oxide, forming water and leaving a reduced metal. The effluent of this chamber, which now contains essentially paraffin and olefin hydrocarbons and water vapor, and which has only a slightly lower pressure then the material entering through conduit 10, passes through conduit 60 and valve 61 to cooler 62 wherein it is cooled to a temperature such that an appreciable portion of the water is condensed. From cooler 62 the stream passes through conduit 63 to a water separator 64. Water which has been condensed collects in separator 64 and may be removed therefrom through conduit 65 controlled by valve 66. The rest of the stream passes through conduit 67 to chamber 68 wherein a further and substantially complete removal of water is effected by means of a suitable drying agent such as activated alumina, or bauxite, or calcium chloride, or the like.

The effluent of chamber 68, which contains a substantial proportion of olefin hydrocarbons, is now treated in a second or synthesis step of my process. This effluent passes through conduit 70 and valve 71 and through conduit 85 controlled by valve 86 to heating coil 87 located in a heater 88. The hydrocarbon stream, heated to a suitable reaction temperature, passes from heating coil 87 through conduit 90 and enters reaction chamber 91 wherein synthesis reactions take place, forming heavier hydrocarbons, such as those in the motor-fuel boiling range. These synthesis reactions may be predominantly polymerization reactions of the olefins, or they may be alkylation reactions wherein olefin and paraffin hydrocarbons react to form hydrocarbons having a higher molecular weight. All or a substantial portion of the material passing into conduit 90 from the heating coil 87 may be diverted into the manifold 92 which is controlled by valve 93, valve 94 in conduit 90 being partially or completely closed, and this material may then be passed to reaction chamber 91 through a plurality of conduits such as conduits 95, 96, 97 and 98, controlled respectively by valves 100, 101, 102 and 103. If desired, a hydrocarbon fraction from an extraneous source may be introduced to reaction chamber 91 through conduit 104 controlled by valve 105. Hydrocarbons so introduced into the process will react with hydrocarbons produced in the preliminary stage of my process, forming hydrocarbons in the motor-fuel boiling range, as when low-boiling isoparaffins are introduced to be reacted by alkylation with olefins. If a simple thermal conversion is carried out, the coil 87 may be adapted for both heating and conversion, in which case chamber 91 may not be used, and can be by-passed by a conduit not shown. In any case the reaction effluent passes through conduit 106 controlled by valve 107 and enters fractionating means 108. In fractionating means 108 the hydrocarbons in the motor-fuel boiling range are separated from lighter hydrocarbons and are passed from the system through conduit 110 controlled by valve 111. Hydrocarbons having low molecular weights are passed from fractionating means 108 through conduit 112 controlled by valve 113 and enter the storage tank or surge tank 114. If desired these hydrocarbons may be cooled and partially or completely liquefied by passing the material from conduit 112 through conduit 115 controlled by valve 116, valve 113 being closed, and then through cooler 117 and valve 118 to the tank 114. Light hydrocarbons, or hydrocarbons in excess, may be passed from this tank through conduit 120 controlled by valve 121. Hydrocarbons which are destined for recycle purposes are removed from tank 114 through conduit 122, compressed by pump 123 to a suitable pressure and passed through conduit 124 and valve 125 to conduit 50 and on to conduit 10 where they are mixed with fresh hydrocarbons charged to the process. If desired, some of this material may be discharged from the process through conduit 126 controlled by valve 127. The liquid hydrocarbon material recovered through conduit 110 may be subjected to further treatment as desired.

In case partial drying of the effluents of dehydrogenizing chamber 58 is not necessary, the effluent of this chamber may be passed directly through conduit 77 and valve 78, conduit 72 and then to conduit 85. In this case, valve 61 in conduit 60 will be closed. If only a partial drying of this effluent is necessary, valve 61 may be opened and valve 78 closed, and the partially dried effluent of settling tank 64 passing through conduit 67 may be passed through conduit 80 controlled by valve 81 to conduit 72, and then through conduit 85, valve 82 in conduit 67 being closed along with valve 71 in conduit 70.

The hydrocarbon stream passing through conduit 30 may be increased in olefin content by passing a part of it back through the immediately preceding dehydrogenating and dehydrogenizing steps. This can be effected by partially or completely opening valve 45 in conduit 44 and partially or completely closing valve 33 in conduit 32, whereby all or a desired part of the material passed through conduit 30 is to be circulated through the first step. The material passing through conduit 44 is boosted somewhat in pressure by compressor 46 and passes through conduit 47 controlled by valve 48 into conduit 50 and then back to conduit 10. By such a procedure I may at times be able to do a sufficiently complete job of forming olefin hydrocarbons with this one step. If such is the case a portion of the material passing through conduit 30 is passed through conduit 72 and valve 73, valve 33 in conduit 32 being completely closed and the material will then pass from conduit 72 directly into conduit 85 for further processing as has been described.

In case the material passing through conduit 70 and/or conduit 72 is not at a sufficient pressure for the further stages of the process, this material may be readily boosted in pressure by opening valve 130 in conduit 131 and valve 132 in conduit 133 and closing valve 86 whereby the material passes through conduit 131, the cooler and condenser 134, adapted to cool the mixture to a temperature of about 50 to 90° F. which is sufficient to liquefy substantially the entire stream at the pressure which exists at this point. The liquid stream then passes through conduit 135 and is boosted sufficiently by liquid pump 136 so that the pressure on the subsequent part of the system will be adequate, such as 1000 to 5000 pounds per square inch or more. Since hydrogen is substantially completely absent from the material passing through conduit 72 and/or conduit 70, cooler 134 is readily used to cool hydrocarbon material without subatmospheric refrigeration so that it will be liquefied under the pressure which exists at this point, and pump 136 is then needed only to increase the pressure upon the liquid stream of hydrocarbon, a process which is easily and inexpensively accomplished.

Although coolers 22 and 62 have been shown as indirect coolers, direct cooling by means of the injection of liquid water, which has been cooled by atmospheric evaporation, at a suitable easily determined temperature, by conduits not shown, may take place at this point. This affords efficient direct heat exchange, and since in any case the hydrocarbon streams leaving the water separators 24 and 64 are in equilibrium with water at the temperatures prevailing at this point, water so added for direct cooling is removed from the process along with water condensed from the effluents of the dehydrogenizing chambers.

For the dehydrogenation step, pressures from 15 to 1000 pounds or more per square inch may be employed, but I prefer to operate in the range of 50 to 500 pounds per square inch. Dehydrogenation temperatures are preferably in the range of about 650 to 1200° F. When two or more dehydrogenation steps are used the effluent of the first step should preferably contain not more than about 10 per cent by volume of olefins while the final effluent from the dehydrogenation, which is passed to the synthesis step should contain appreciably more than 10 per cent by volume of olefins.

Catalysts suitable for the dehydrogenation are aluminum oxide, titanium oxide, bauxite, or an active form of chromium oxide, and many others. Chromium oxide, being more subject to temporary poisoning by water than titanium oxide or aluminum oxide, for example, requires somewhat more scrupulous removal of water, and may be used in the first step while a material such as bauxite is used in a subsequent step.

In the dehydrogenizing of the effluents of the dehydrogenation steps, or removing free hydrogen therefrom, by the action of copper oxide or the like, the oxide is reduced and must be regenerated to the oxide state by suitable means. Reduced copper oxide may be removed from traps 140 and 141 and fresh copper oxide to replace it may be introduced through traps 142 and 143, the copper oxide being reformed for re-use by heating, for example, in a stream of air to a temperature of 400 to 750° F. Optionally a copper oxide chamber, such as 18, can be alternately used to effect hydrogen removal, then the reduced copper can be reformed into copper oxide by the passage of air over this material, a similar alternate chamber containing copper oxide, not shown, being used in the process. To effect reaction of copper oxide and hydrogen, a temperature suitably in the range of 400 to 650° F. is maintained. A certain amount of exothermic heat is developed by the reaction, which may be prevented from developing too high local temperatures by reversing the direction of the flow to the chamber at short intervals, by the introduction of water or other cooling fluids to the mass, by introducing a part of the incoming hydrocarbon stream cooled to a temperature below that of the hydrogen-removal reaction to various points within the copper oxide mass, by incorporating heat-absorbing substances such as aluminum shot with the copper oxide, and by other means.

Most freshly reduced metal oxides suitable for use in my process yield metals possessing catalytic activity for the hydrogenation of olefins. Thus, freshly formed copper will induce the union of hydrogen with olefin and thus undo part of the dissociation effected by the dehydrogenation reactions. This effect may be minimized by providing a suitable poison or inhibitor which will not interfere with the dehydrogenizing action. For example, minute concentrations of arsine or other suitable volatile arsenic compounds, hydrogen sulfide or readily decomposed sulfides that yield reactive sulfide sulfur, and other poisoning materials readily evaluated by trial for particular applications, may be introduced with the hydrocarbon stream entering the metal oxide chamber, or difficultly volatile compounds which are poisons or inhibitors may be incorporated in the body of metal oxide. Gaseous hydrogenation inhibitors may be added through conduit 144 controlled by valve 145 to conduit 17 and/or through conduit 146 controlled by valve 147 to conduit 57.

The paraffin-olefin mixture produced by the dehydrogenating-dehydrogenizing operations described may be converted into motor-fuel hydrocarbons by thermal polymerization at moderate pressures, such as 50 to 500 pounds per square inch, whereby largely cyclic oils are formed, or to thermal polymerization at higher pressures which may be as high as 10,000 pounds per square inch or more, whereby a more aliphatic type of gasoline is formed. Under such high-pressure conditions the union of the paraffin with olefin takes place more efficiently when the introduction of the hydrocarbon mixture containing olefins takes place at several points in the reaction chamber or zone. If desired, the paraffin-olefin mixture may be treated by catalytic polymerization to convert the olefins contained therein to gasoline hydrocarbons, which may be effected at low pressures such as the heretofore-specified range of 50 to 500 pounds per square inch, or at higher pressures. Temperatures of reaction for catalytic polymerization range from 75 to 650° F. as contrasted with 650 to 1100° F., which is the range required in general for thermal polymerization reactions.

Catalysts for such polymerization reactions, which are not to be considered equivalents of each other, include aluminum chloride, sulfuric acid, phosphoric acid, dried hydrous alumina associated with hydrous silica, and many others. Some of these catalysts favor to a greater degree the union of olefins with paraffins than do others, but all of such catalysts favor olefin-olefin union. The addition of the reactant stream at several points favors additionally olefin-paraffin union when the higher yield obtainable in this way is desired.

When it is desired to conduct the synthesis step just described at a higher pressure than that at which the hydrogenation is conducted, this may be done without the use of expensive gas-compression operations by virtue of the removal of hydrogen as described. Thus valve 86 may be closed and the paraffin-olefin stream passed through conduit 131 diverted to cooler 134, wherein the temperature is reduced sufficiently to produce a liquid condition, the liquid then passes to pump 136, where it is cheaply elevated by the liquid pump to the desired pressure, and then passes through conduits 133 and 85 to heating coil 87.

As an example of the operation of this process, a mixture of propane and butanes under 100 pounds pressure may be passed through a mass of granular bauxite coated with chromium oxide as dehydrogenation catalyst at about 930° F., then through a dehydrogenizing-dehydrating operation as described to produce a concentration of 7 per cent propylene-butylene. Upon subjecting the stream to two additional and similar dehydrogenating and dehydrogenizing operations a virtually hydrogen-free stream containing about 19 per cent olefins will result. The stream is then cooled to about 70° F. to produce a liquid condition. After passing through a liquid pump whereby the pressure is elevated to 500 pounds without compression of gases, the hydrocarbons are heated to 300° F. and passed through a bed of sodium chloro-aluminate, portions of this stream being introduced at several points along the catalyst bed. A reaction involving juncture of paraffins with olefins takes place to produce 30 per cent of gasoline in the effluent stream, the remaining 70 per cent being virtually unreacted paraffins. From this stream the gasoline may be readily separated, the unreacted light paraffins being returned to the dehydrogenation operation together with fresh propane and butane.

Many modifications of this invention may obviously be used, and can be adapted by one skilled in the art without departing from the spirit of the disclosure. The restrictions used in the example, and in connection with the drawing, need not necessarily be used as limits for any particular operation or set of conditions as they are presented primarily for purposes of illustration. It will be understood that the flow diagram presented and described herewith is schematic only, and that many additional pieces of equipment, such as pressure gauges, valves, flow meters, pumps, heat exchangers, reflux accumulators, fractionators, and the like will be necessary for any particular installation, and can be readily specified and adopted for specific plants by one skilled in the art. The essential equipment and material flow have been described and discussed in sufficient detail to serve as an efficient guide.

What I claim is:

1. In a process for the dehydrogenation of a paraffin hydrocarbon having at least two carbon atoms per molecule to form unsaturated hydrocarbons and free hydrogen, the improvement which comprises subjecting the effluent from such a dehydrogenation process to the action of a reducible metal oxide at a temperature not higher than approximately 650° F., to react free hydrogen with said metal oxide and form water, in the presence of an added material adapted to inhibit any substantial action as a hydrogenation catalyst of the metal which is formed in such reaction.

2. In a process for the dehydrogenation of paraffin hydrocarbons having at least two carbon atoms per molecule over a dehydrogenation catalyst at dehydrogenating conditions of temperature and pressure to form unsaturated hydrocarbons and free hydrogen, the improvement which comprises subjecting the effluent form such a dehydrogenation process to the action of a reducible metal oxide at a temperature, not higher than approximately 650° F., to react free hydrogen with said metal oxide and form water, in the presence of an added material adapted to inhibit any substantial action as a hydrogenation catalyst of the metal which is formed in such reaction.

3. In a process for the dehydrogenation of a paraffin hydrocarbon having at least two carbon atoms per molecule to form unsaturated hydrocarbons and free hydrogen, the improvement which comprises subjecting the effluent from such a dehydrogenation process to the action of copper oxide at a temperature not higher than approximately 650° F., to react free hydrogen with said copper oxide and form water, in the presence of an added material adapted to inhibit any substantial action as a hydrogenation catalyst of the copper metal which is formed in such reaction.

4. In a process for the dehydrogenation of a paraffin hydrocarbon having at least two carbon atoms per molecule to form unsaturated hydrocarbons and free hydrogen, the improvement which comprises subjecting the effluent from such a dehydrogenation process to the action of copper oxide at a temperature not higher than approximately 650° F., to react free hydrogen with said copper oxide and form water, in the presence of arsine, to inhibit any substantial action as a hydrogenation catalyst of the copper metal which is formed in such reaction.

5. In a process for the dehydrogenation of a paraffin hydrocarbon having at least two carbon atoms per molecule to form unsaturated hydrocarbons and free hydrogen, the improvement which comprises subjecting the effluent from such a dehydrogenation process to the action of copper oxide at a temperature not higher than approximately 650° F., to react free hydrogen with said copper oxide and form water, in the presence of added hydrogen sulfide, to inhibit any substantial action as a hydrogenation catalyst of the copper metal which is formed in such reaction.

6. In a process for the production of higher-boiling hydrocarbons from lower-boiling paraffin hydrocarbons containing at least three carbon atoms per molecule, the improvement which comprises dehydrogenating such a paraffin hydrocarbon material at a substantial superatmospheric pressure of not more than approximately 1000 pounds per square inch, to form olefins and free hydrogen, subjecting the effluent of said dehydrogenation without substantial reduction of pressure to the action of a reducible metal oxide in the absence of added free oxygen at a temperature not in excess of approximately 650° F. and in the presence of an added material adapted to inhibit any substantial action as a hydrogenation catalyst of the metal which is formed in such reaction, to form water and dehydrogenize said effluent, removing water from the effluent of said dehydrogenizing treatment, to obtain a hydrocarbon mixture at a substantial superatmospheric pressure and containing low-boiling olefins, said superatmospheric pressure being not appreciably lower than the pressure under which the treatment with said reducible metal oxide occurred, and subjecting the resultant hydrocarbon mixture at said superatmospheric pressure to such conversion conditions as to react said olefins and form higher-boiling normally liquid hydrocarbons.

7. A multistep process for the production of hydrocarbons in the motor-fuel boiling range from paraffin hydrocarbons having lower molecular weights, which comprises subjecting a hydrocarbon mixture consisting predominantly of paraffin hydrocarbons having at least three and not more than five carbon atoms per molecule at a pressure not greater than approximately 500 pounds per square inch to the action of a dehydrogenation catalyst at a dehydrogenating temperature, to convert the paraffin hydrocarbons into gaseous olefins and free hydrogen, subjecting the effluent of said dehydrogenation without substantial reduction in pressure to the action of a reducible metal oxide at a temperature between approximately 400° and approximately 650° F. and in the presence of an added material which acts to inhibit any substantial action as a hydrogenation catalyst of the metal which is formed in such reaction, to react the free hydrogen with said metal oxide to form water, removing water from the effluent of said dehydrogenizing treatment without any substantial reduction in pressure, to produce a substantially dry, substantially hydrogen-free hydrocarbon mixture containing normally gaseous olefins, cooling said hydrocarbon mixture to a temperature such that said hydrocarbons are substantially in the liquid phase at the pressure prevailing throughout the system at this point, raising the pressure of said liquid hydrocarbon mixture to a high superatmospheric pressure suitable for a subsequent conversion step, subjecting said hydrocarbon mixture to such reaction conditions of temperature and pressure as to produce normally liquid hydrocarbons in the motor-fuel boiling range, and separating from the effluent of the last said step a fraction containing hydrocarbons in the motor-fuel boiling range so produced.

8. A process for the production of hydrocarbons in the motor-fuel boiling range from paraffin hydrocarbons having lower molecular weights, which comprises subjecting a hydrocarbon mixture consisting predominantly of paraffin hydrocarbons having at least three and not more than five carbon atoms per molecule at a pressure between approximately 50 and approximately 500 pounds per square inch to the action of a dehydrogenation catalyst at a dehydrogenating temperature, to convert the paraffin hydrocarbons into gaseous olefins and free hydrogen, subjecting the effluent of said dehydrogenation without substantial reduction in pressure and at a temperature between approximately 400° and approximately 650° F. to the action of a reducible metal oxide in the presence of an added material which acts to inhibit any substantial action as a hydrogenation catalyst of the metal which is formed in such reaction, to react the free hydrogen with said metal oxide to form water and to dehydrogenize said effluent, removing water from the effluent of said dehydrogenizing treatment without any substantial reduction in pressure, to produce a substantially dry, substantially hydrogen-free olefin-containing hydrocarbon mixture, subjecting said mixture without any substantial reduction in pressure to the action of a polymerization catalyst at such a reaction temperature and pressure as to produce from the gaseous olefins contained in said mixture normally liquid hydrocarbons in the motor-fuel boiling range, and removing from the effluents of said polymerization a fraction containing hydrocarbons in the motor-fuel boiling range so produced.

9. A multistep process for the production of normally liquid hydrocarbons in the motor-fuel boiling range from paraffin hydrocarbons having lower boiling points, which comprises subjecting a hydrocarbon mixture consisting predominantly of paraffin hydrocarbons having at least three and not more than five carbon atoms per molecule at a substantial superatmospheric pressure not greater than 500 pounds per square inch to the action of a dehydrogenation catalyst at a dehydrogenating temperature, to convert paraffin hydrocarbons into free hydrogen and olefins having not more than five carbon atoms per molecule, subjecting the effluent of said dehydrogenation without substantial change in pressure to the action of a reducible metal oxide at a temperature between approximately 400° and approximately 650° F., to react free hydrogen with said metal oxide and form water, adding to the mixture in contact with said metal oxide a material in the gaseous state adapted to inhibit the action as a hydrogenation catalyst of the metal which is formed in such reaction, removing water from the effluent of said dehydrogenizing treatment, to produce a substantially dry, substantially hydrogen-free hydrocarbon mixture containing olefins having not more than five carbon atoms per molecule, subjecting said hydrocarbon mixture without any substantial reduction in pressure to such reaction conditions of temperature and pressure as to react said olefin hydrocarbons to form normally liquid hydrocarbons in the motor-fuel boiling range, and removing from the effluent of said last step a fraction containing said normally liquid hydrocarbons so produced.

10. A multistep process for the production of hydrocarbons in the motor-fuel boiling range from paraffin hydrocarbons having lower molecular weights, which comprises subjecting a hydrocarbon mixture consisting predominantly of paraffin hydrocarbons having at least three and not more than five carbon atoms per molecule at a pressure between approximately 250 and approximately 1000 pounds per square inch to the action of a dehydrogenation catalyst at a dehydrogenating temperature, to convert the paraffin hydrocarbons into free hydrogen and olefins having not more than five carbon atoms per molecule, subjecting the effluent of said dehydrogenation without substantial change in pressure to the action of a reducible metal oxide at a temperature between approximately 400° and approximately 650° F. and in the presence of an added material which is adapted to inhibit any substantial action as a hydrogenation catalyst of the metal which is formed in such reaction, to react the free hydrogen with said metal oxide to form water, removing water from the effluent of said dehydrogenizing treatment without any substantial change in pressure, subjecting the resultant mixture without substantial reduction in pressure to at least one further series of steps comprising dehydrogenation, dehydrogenizing and dehydration, to produce a substantially dry, substantially hydrogen-free hydrocarbon mixture containing a substantial proportion of olefins having not more than five carbon atoms per molecule, subjecting said hydrocarbon mixture without substantial reduction in pressure to such synthesis conditions of temperature and pressure as to react olefin hydrocarbons and to form hydrocarbons in the motor-fuel boiling range, and removing from the effluent of the last said step a fraction containing hydrocarbons in the motor-fuel boiling range so produced.

11. A process for the production of hydrocarbons in the motor-fuel boiling range from paraffin hydrocarbons having lower boiling points and containing at least three carbon atoms per molecule, which comprises passing such paraffin hydrocarbons over a dehydrogenation catalyst at a dehydrogenating temperature and at a pressure between approximately 250 and approximately 500 pounds per square inch, to form olefins and free hydrogen, passing the effluent of said dehydrogenation in the absence of added oxygen-containing gases at a temperature between approximately 400° and approximately 650° F. over a reducible metal oxide associated with an added material to inhibit the action as a hydrogenation catalyst of the metal which is formed in such reaction, to react free hydrogen with said metal oxide to form water and to dehydrogenize said effluent, removing water from the effluent of said dehydrogenizing treatment, subjecting said dried effluent to at least one other such dehydrogenation and dehydrogenizing treatment to form additional olefins, subjecting the resultant hydrocarbon material to such synthesis conditions of temperature and pressure as to react olefin hydrocarbons to form hydrocarbons in the motor-fuel boiling range, and conducting said operations without any substantial reduction of pressure.

12. A process for the production of hydrocarbons in the motor-fuel boiling range from paraffin hydrocarbons having lower boiling points and having molecular weights higher than that of ethane, which comprises subjecting such a paraffin hydrocarbon material to contact with a dehydrogenation catalyst at a dehydrogenating temperature and at a pressure between approximately 50 and approximately 500 pounds per square inch for a period of time sufficient to produce free hydrogen together with not more than approximately 10 per cent by volume of olefins in the effluent, passing the effluent of said dehydrogenation over a reducible metal oxide at a temperature between approximately 400° and approximately 650° F. in the presence of an added material adapted to inhibit any substantial action as a hydrogenation catalyst of the metal which is formed in such reaction, to react free hydrogen with said metal oxide to form water and to dehydrogenize said effluent without substantial hydrogenation of said olefins, removing water from the effluent of said dehydrogenizing treatment, subjecting said dried effluent to at least one other combination of steps comprising such a dehydrogenation, dehydrogenizing treatment and drying, to produce a hydrocarbon material having an olefin content appreciably greater than approximately 10 per cent by volume, subjecting the resultant olefin-containing hydrocarbon mixture to such synthesis conditions of temperature and pressure as to react olefin hydrocarbons to form hydrocarbons in the motor-fuel boiling range, removing from the resultant material a hydrocarbon fraction containing hydrocarbons in the motor-fuel boiling range so produced, and conducting the entire series of conversion steps without substantial change in pressure other than that occasioned by normal pressure drop through the apparatus.

13. A process for the production of hydrocarbons in the motor-fuel boiling range from paraffin hydrocarbons having lower boiling points and having molecular weights higher than that of ethane, which comprises subjecting such a paraffin hydrocarbon material to contact with a dehydrogenation catalyst at a dehydrogenating temperature and at a pressure between approximately 250 and approximately 1000 pounds per square inch for a period of time sufficient to produce free hydrogen together with not more than approximately 10 per cent by volume of olefins in the effluent, passing the effluent of said dehydrogenation over copper oxide at a temperature between approximately 400° and approximately 650° F. in the presence of an arsenic compound, to react free hydrogen with said copper oxide to form water and to dehydrogenize said effluent without substantial hydrogenation of said olefins, removing water from the effluent of said dehydrogenizing treatment, subjecting said dried effluent to at least one other combination of steps comprising such a dehydrogenation, dehydrogenizing treatment and drying, to produce a hydrocarbon material having an olefin content appreciably greater than approximately 10 per cent by volume, subjecting the resultant olefin-containing hydrocarbon mixture to such synthesis conditions of temperature and pressure as to react olefin hydrocarbons to form hydrocarbons in the motor-fuel boiling range, and removing from the resultant material a hydrocarbon fraction containing hydrocarbons in the motor-fuel boiling range so produced.

FREDERICK E. FREY.